(12) United States Patent
Hagiwara et al.

(10) Patent No.: US 12,104,230 B2
(45) Date of Patent: Oct. 1, 2024

(54) PRESSED POWDER MATERIAL AND ROTATING ELECTRIC MACHINE

(71) Applicant: KABUSHIKI KAISHA TOSHIBA, Tokyo (JP)

(72) Inventors: Masaya Hagiwara, Yokohama Kanagawa (JP); Tomohiro Suetsuna, Kawasaki Kanagawa (JP); Naoyuki Sanada, Kawasaki Kanagawa (JP); Hiroaki Kinouchi, Meguro Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 17/466,784

(22) Filed: Sep. 3, 2021

(65) Prior Publication Data

US 2022/0298613 A1    Sep. 22, 2022

(30) Foreign Application Priority Data

Mar. 22, 2021  (JP) ................................. 2021-046801

(51) Int. Cl.
*C22C 38/10*   (2006.01)
*B22F 1/05*    (2022.01)
(Continued)

(52) U.S. Cl.
CPC ............... *C22C 38/10* (2013.01); *B22F 1/05* (2022.01); *C22C 38/02* (2013.01); *H02K 1/02* (2013.01);
(Continued)

(58) Field of Classification Search
None
See application file for complete search history.

(56) References Cited

U.S. PATENT DOCUMENTS

| | | | |
|---|---|---|---|
| 2004/0074564 A1* | 4/2004 | Brunner | H01F 41/0246 |
| | | | 148/105 |
| 2013/0228717 A1* | 9/2013 | Harada | H01F 1/33 |
| | | | 252/62.55 |

(Continued)

FOREIGN PATENT DOCUMENTS

| | | |
|---|---|---|
| JP | 2006-245472 A | 9/2006 |
| JP | 2009-164401 A | 7/2009 |

(Continued)

OTHER PUBLICATIONS

Halder et al., "Separation of particle size and lattice strain in integral breath measurements," *Acta Cryst.* Short Communications, vol. 20, pp. 312-313 (1966).

(Continued)

*Primary Examiner* — Xiaobei Wang
(74) *Attorney, Agent, or Firm* — Finnegan, Henderson, Farabow, Garrett & Dunner, LLP

(57) ABSTRACT

A pressed powder material according to embodiments is a pressed powder material including first magnetic metal particles having a first magnetic metal phase containing Fe and Co; and second magnetic metal particles having a second magnetic metal phase containing Fe, in which when the amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and 1 or greater for the second magnetic metal particles, the second magnetic metal particles are present between the particles of the first magnetic metal particles, and the average value of the major axis of the second magnetic metal particles is equal to or longer (Continued)

SCHEMATIC CROSS-SECTIONAL VIEW OF PRESSED POWDER MATERIAL OF EMBODIMENTS than the average value of the major axis of the first magnetic metal particles.

9 Claims, 11 Drawing Sheets

(51) Int. Cl.
    *C22C 38/02*       (2006.01)
    *H02K 1/02*       (2006.01)

(52) U.S. Cl.
    CPC ....... *B22F 2301/35* (2013.01); *B22F 2304/10* (2013.01); *C22C 2202/02* (2013.01)

(56) References Cited

U.S. PATENT DOCUMENTS

| | | |
|---|---|---|
| 2017/0076845 A1 | 3/2017 | Suetsuna et al. |
| 2017/0209924 A1* | 7/2017 | Suetsuna ............... B22F 1/0551 |
| 2018/0258513 A1 | 9/2018 | Suetsuna et al. |
| 2019/0238021 A1 | 8/2019 | Kinouchi et al. |
| 2019/0283127 A1 | 9/2019 | Kinouchi et al. |
| 2020/0035391 A1 | 1/2020 | Suetsuna et al. |
| 2020/0043639 A1 | 2/2020 | Suetsuna et al. |
| 2020/0082963 A1 | 3/2020 | Suetsuna et al. |
| 2020/0303106 A1 | 9/2020 | Suetsuna et al. |
| 2020/0340087 A1 | 10/2020 | Suetsuna et al. |
| 2021/0082608 A1 | 3/2021 | Sanada et al. |
| 2021/0305851 A1 | 9/2021 | Sanada et al. |
| 2022/0072606 A1 | 3/2022 | Suetsuna et al. |
| 2022/0085669 A1 | 3/2022 | Kinouchi et al. |

FOREIGN PATENT DOCUMENTS

| | | |
|---|---|---|
| JP | 2015-56618 A | 3/2015 |
| JP | 2017-59816 A | 3/2017 |
| JP | 2017-135358 A | 8/2017 |
| JP | 2018-142642 A | 9/2018 |
| JP | 2018-152449 A | 9/2018 |
| JP | 2019-58014 A | 4/2019 |
| JP | 2019-161183 A | 9/2019 |
| JP | 2020-25077 A | 2/2020 |
| JP | 2020-43268 A | 3/2020 |
| JP | 2020-155525 A | 9/2020 |
| JP | 2021-48238 A | 3/2021 |
| JP | 2021-147651 A | 9/2021 |
| JP | 2022-43455 A | 3/2022 |
| JP | 2022-49889 A | 3/2022 |
| WO | WO 2019/058602 A1 | 3/2019 |

OTHER PUBLICATIONS

Japan Patent Office, Decision to Grant a Patent in JP App. No. 2013-051329, 3 pages, with machine translation, 3 pages (Jul. 23, 2024).

* cited by examiner

SCHEMATIC CROSS-SECTIONAL VIEW OF
PRESSED POWDER MATERIAL OF EMBODIMENTS

EXEMPLARY METHOD FOR DETERMINING
MAJOR AXIS AND MINOR AXIS OF MAGNETIC METAL PARTICLE
BY OBSERVING CROSS-SECTIONAL VIEW OF PRESSED POWDER MATERIAL

IN CASE OF
TRIANGULAR SHAPE

IN CASE OF QUADRILATERAL
SHAPE

IN CASE OF ROUNDISH
SHAPE

SCHEMATIC DIAGRAM OF COATING LAYER OF MAGNETIC METAL PARTICLE

FIG.4
CONTROL SYSTEM BASED ON PLL
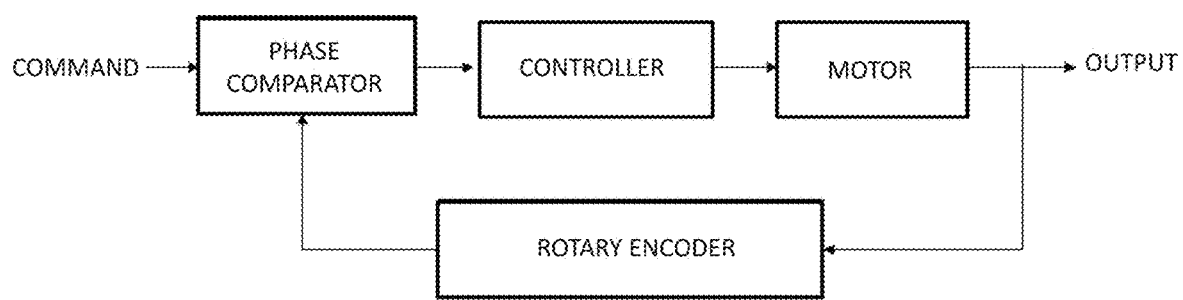
CONTROL SYSTEM BASED ON INVERTER
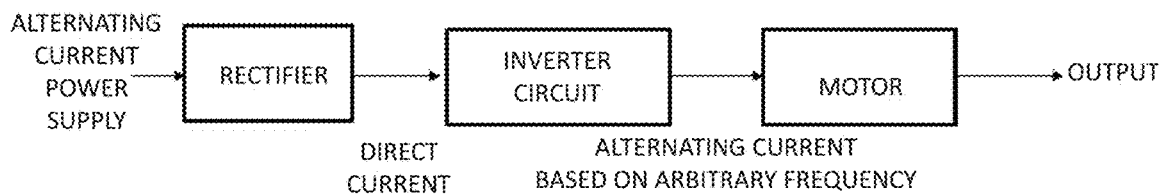

FIG.9
SCHEMATIC DIAGRAM
OF RING-SHAPED INDUCTOR
SCHEMATIC DIAGRAM OF
ROD-SHAPED INDUCTOR
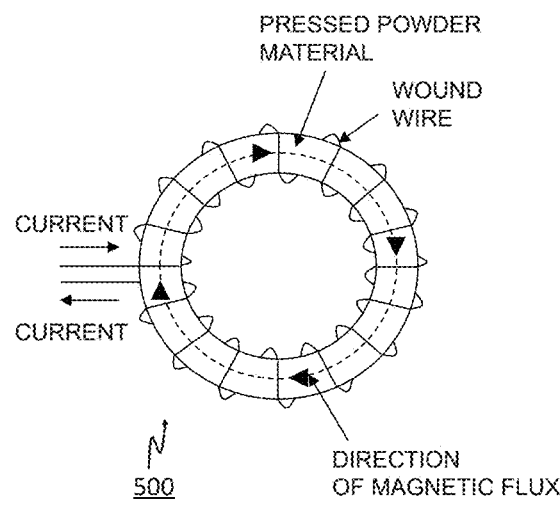
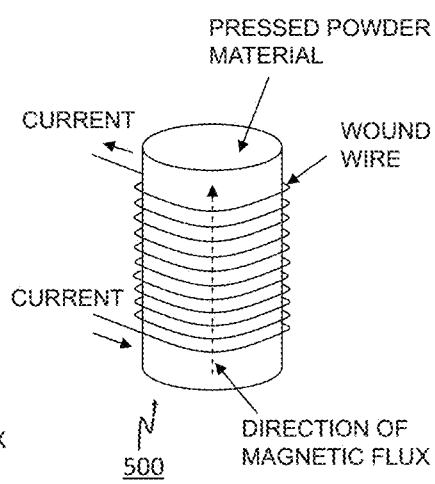

FIG.10
SCHEMATIC CROSS-SECTIONAL VIEW OF CHIP INDUCTOR
SCHEMATIC DIAGRAM OF PLANAR INDUCTOR
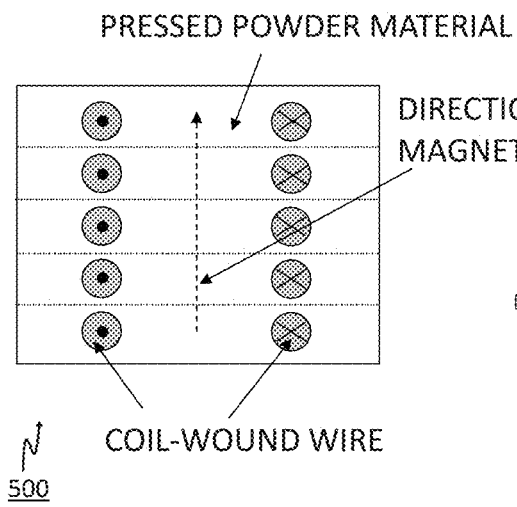
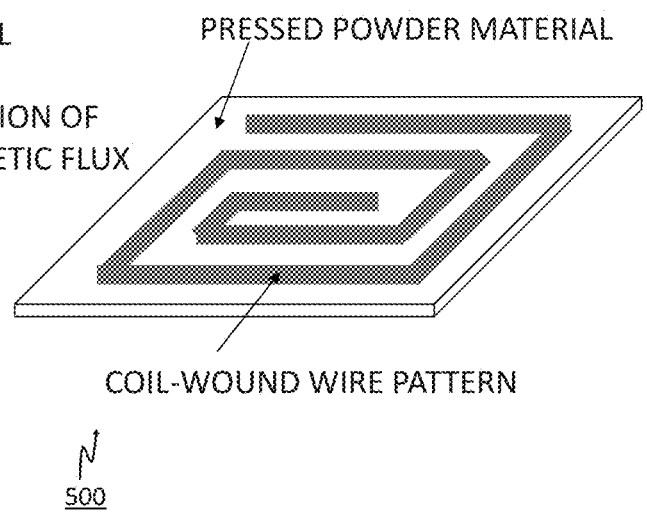

PRESSED POWDER MATERIAL AND ROTATING ELECTRIC MACHINE

CROSS-REFERENCE TO RELATED APPLICATION

This application is based upon and claims the benefit of priority from Japanese Patent Application No. 2021-046801, filed on Mar. 22, 2021, the entire contents of which are incorporated herein by reference.

FIELD

Embodiments described herein relate generally to a pressed powder material and a rotating electric machine.

BACKGROUND

Currently, soft magnetic materials are applied to the component parts of various systems and devices, such as rotating electric machines (for example, motors, generators, and the like), potential transformers, inductors, transformers, magnetic inks, and antenna devices. Thus, soft magnetic materials are regarded as very important materials. In these component parts, the real part of the magnetic permeability (real part of the relative magnetic permeability), $\mu'$, of a soft magnetic material is utilized, and therefore, in the case of actual use, it is preferable to control $\mu'$ in accordance with the working frequency band. Furthermore, in order to realize a highly efficient system, it is preferable to use a material having a loss that is as low as possible. That is, it is preferable to make the imaginary part of the magnetic permeability (imaginary part of the relative magnetic permeability), $\mu''$ (corresponding to a loss), as low as possible. In regard to the loss, the loss factor, tan $\delta$ ($=\mu''/\mu' \times 100(\%)$) serves as a criterion, and as $\mu''$ becomes smaller relative to $\mu'$, the loss factor tan S becomes smaller, which is preferable. In order to attain such conditions, it is preferable to make the core loss for the conditions of actual operation small, that is, it is preferable to make the eddy current loss, hysteresis loss, ferromagnetic resonance loss, and residual loss (other losses) as small as possible. In order to make the eddy current loss small, it is effective to increase the electrical resistance, decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses be small, particularly under the operation conditions in which the effective magnetic field applied to the material is large, such as high current and high voltage. To attain this end, it is preferable that the saturation magnetization of a soft magnetic material is as large as possible so as not to bring about magnetic saturation. Furthermore, in recent years, since size reduction of equipment is enabled by utilization of high frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy savings and environmental issues, there is a demand to increase the efficiency of systems as high as possible. Particularly, since motor systems are responsible for a major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to magnetic wedges (magnetic chocks) that are used in some motors, there is a demand for minimizing losses as far as possible. In addition, there is the same demand also for systems that use transformers. In motors, transformers and the like, the demand for size reduction is also high, along with efficiency enhancement. In order to realize size reduction, it is essential to maximize the magnetic permeability and saturation magnetization of the soft magnetic materials as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Furthermore, soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy savings and environmental protection has been actively advocated, and reduction of the amount of $CO_2$ emission and reduction of the dependency on fossil fuels have been required. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management system (HEMS) and building and energy management system (BEMS), which control the electric power generated by solar power generation, wind power generation or the like by a smart grid and supply the electric power to homes, offices, and plants with high efficiency, as environment-friendly power saving systems, has been actively advocated. In such a movement for energy savings, power semiconductor devices play a key role. Power semiconductor devices are semiconductor devices that control high electric power or energy with high efficiency, and examples include individual power semiconductor devices such as an insulated gate bipolar transistor (IGBT), a MOSFET, a power bipolar transistor, and a power diode; power supply circuits such as a linear regulator and a switching regulator; and an LSI logic circuit for power management to control the above-mentioned devices. Power semiconductor devices are widely used in all sorts of equipment including domestic electrical appliances, computers, automobiles, and railways, and since expansion of the supply of these applied apparatuses, and an increase in the mounting ratio of power semiconductor devices in these apparatuses can be expected, a rapid growth in the market for power semiconductor devices in the future is anticipated. For example, inverters that are installed in many domestic electrical appliances use power semiconductor devices nearly in all parts, and thereby extensive energy saving is made possible. Currently, Si occupies a major part in power semiconductor devices;

however, for a further increase in efficiency or further size reduction of equipment, utilizing SiC and GaN is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, high magnetic permeability and low magnetic loss in the driving frequency bands, as well as high saturation magnetization that can cope with a large electric current are preferable. In a case where saturation magnetization is high, it is difficult to induce magnetic saturation even if a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to the devices of high frequency communication equipment such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication equipment from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder material is more preferable than materials having a sheet shape or a ribbon shape. However, generally, when a pressed powder material is used, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Characteristics enhancement from non-directional silicon steel sheets to directional silicon steel sheets has been attempted, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder materials that are applicable to complex shapes; however, pressed powder materials have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder materials of Fe-based or Co-based amorphous glass, or MnZn-based ferrite materials. However, all of these materials do not completely satisfy characteristics such as high magnetic permeability, low losses, high saturation magnetization, high thermal stability, high strength, high toughness, and high hardness, and the materials are insufficient.

Examples of existing soft magnetic materials of 100 kHz or higher (MHz frequency band or higher) include NiZn-based ferrites and hexagonal ferrites; however, these materials have insufficient magnetic characteristics at high frequencies.

From the circumstances described above, development of a magnetic material having high saturation magnetization, high magnetic permeability, low losses, high thermal stability, and excellent mechanical characteristics is preferable.

SUMMARY

An object of embodiments to be solved is to provide a pressed powder material having excellent magnetic characteristics and a rotating electric machine that uses this pressed powder material.

A pressed powder material of embodiments is a pressed powder material including first magnetic metal particles having a first magnetic metal phase containing Fe and Co; and second magnetic metal particles having a second magnetic metal phase containing Fe, in which when the amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and 1 or greater for the second magnetic metal particles, the second magnetic metal particles are present between the particles of the first magnetic metal particles, and the average value of the major axis of the second magnetic metal particles is equal to or longer than the average value of the major axis of the first magnetic metal particles.

BRIEF DESCRIPTION OF THE DRAWINGS

FIG. 4 is a schematic diagram of a motor system according to a third embodiment;

FIG. 9 is a schematic diagram of inductors (ring-shaped inductor and rod-shaped inductor) according to the third embodiment;

FIG. 10 is a schematic diagram of inductors (chip inductor and planar inductor) according to the third embodiment.

DETAILED DESCRIPTION

Figure 1:
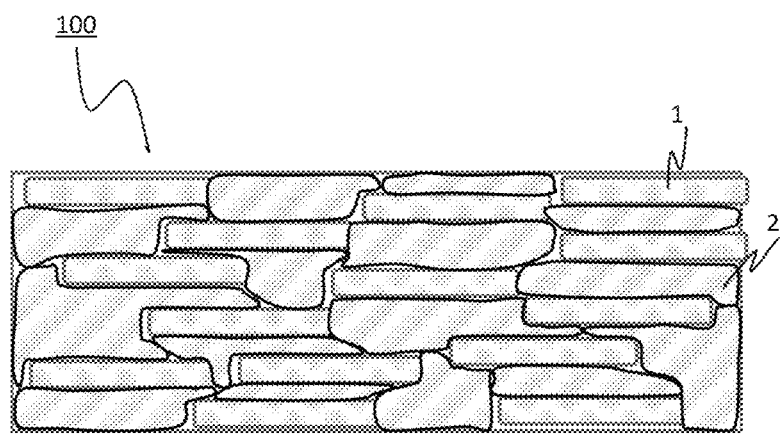
FIG. 1 is a schematic cross-sectional view of a pressed powder material according to a first embodiment.

The pressed powder material of the embodiments is a pressed powder material including first magnetic metal particles having a magnetic metal phase containing Fe and Co; and second magnetic metal particles having a magnetic metal phase containing Fe, in which when the amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and 1 or greater for the second magnetic metal particles, the second magnetic metal particles are present between the particles of the first magnetic metal particles, and the average value of the major axis of the second magnetic metal particles is equal to or longer than the average value of the major axis of the first magnetic metal particles.

In the following description, embodiments will be described using the attached drawings. In the diagrams, an identical or similar reference numeral will be assigned to identical or similar sites.

First Embodiment

The pressed powder material of the present embodiment includes at least two kinds of magnetic metal particles having different Co contents. The first magnetic metal particles have a magnetic metal phase containing Fe and Co, the Co content Co1 denotes the amount of Co with respect to the total amount of Fe and Co in the magnetic metal phase, the second magnetic metal particles have a magnetic metal phase containing Fe, the Co content Co2 denotes the amount of Co with respect to the total amount of Fe and Co in the magnetic metal phase, and the ratio of Co2 to Co1 (Co2/Co1) is from 0 to 0.5.

FIG. 1 is a schematic cross-sectional view of the pressed powder material according to the present embodiment. It is desirable that the first magnetic metal particles have a magnetic metal phase containing Fe, Co, and Si. This case will be described in detail in the following description. The Co content Co1 in the above-described magnetic metal phase is preferably from 5 at % to 80 at %, more preferably from 7 at % to 40 at %, even more preferably from 10 at % to 30 at %, and still more preferably from 10 at % to 20 at %. It is preferable that high saturation magnetization can be realized thereby. Furthermore, the amount of Si is preferably from 0.001 at % to 30 at %, more preferably from 1 at % to 25 at %, and even more preferably from 4 at % to 15 at %, with respect to the entire amount of the magnetic metal phase. As a result, magnetocrystalline anisotropy has an appropriate magnitude, coercivity is likely to decrease, and low hysteresis loss and high magnetic permeability are easily realized. FIG. 1 illustrates a pressed powder material 100, first magnetic metal particles 1, and second magnetic metal particles 2.

It is desirable that the second magnetic metal particles have a magnetic metal phase containing Fe. The Co content Co2 in the above-described magnetic metal phase is preferably from 0 at % to 2.5 at %, and more preferably from 0 at % to 1 at %. Furthermore, the amount of Si is preferably from 0 at % to 30 at %, and more preferably from 0 at % to 10 at %, with respect to the total amount of the magnetic metal phase.

The ratio of Co2 to Co1 (Co2/Co1) is preferably from 0 to 0.5. The ratio is more preferably from 0 to 0.25, and even more preferably from 0 to 0.1. In order to realize high saturation magnetization for a pressed powder material, it is effective to increase the density of the pressed powder material. Regarding a method of increasing the density of a pressed powder material, there is a method of densifying by sintering. However, when a pressed powder material is densified by sintering, the core loss, particularly the eddy current loss, is increased to a large extent. It has been said that as the cross-sectional area of a magnetic body perpendicular to an applied magnetic field is smaller, the eddy current loss is likely to decrease, and it is considered that since particles are combined together by sintering and become coarse, the eddy current loss is increased. In order to achieve both high saturation magnetization and low losses (particularly, low vortex loss), it is necessary to simultaneously satisfy contradictory features as described above. Thus, embodiments are configured to include at least two kinds of magnetic metal particles having different Co contents. First magnetic metal particles having a large Co content have a higher temperature at which sintering proceeds, as compared to second magnetic metal particles having a small Co content. Therefore, a state in which sintering proceeds in the second magnetic metal particles while sintering does not proceed in the first magnetic metal particles, can be realized by selecting an adequate sintering temperature. Furthermore, as the first magnetic metal particles inhibit sintering of the second magnetic metal particles, excessive coarsening of the second magnetic metal particles can be suppressed. Densification of the pressed powder material and suppression of coarsening of the magnetic metal particles are simultaneously realized, and both high saturation magnetization and low losses can be achieved in a well-balanced manner.

The core loss of the pressed powder material can be measured using, for example, a B-H analyzer. The eddy current loss can be calculated from, for example, the frequency-dependence of the core loss. For example, the core loss is measured for a plurality of frequencies, the measured values are plotted on a graph where the axis of abscissa represents frequency and the axis of ordinate represents the core loss, and linear approximation is performed using a least square method. Assuming that the value of the ordinate intercept at that time is the hysteresis loss, the eddy current loss can be evaluated by subtracting the hysteresis loss from the core loss at each frequency.

Detection of the elements included in the particles and the like and measurement of the atomic concentrations of the elements can be carried out using, for example, energy dispersive X-ray spectroscopy (EDX) or wavelength dispersive X-ray fluorescence spectroscopy (WDX). Furthermore, identification of the substances included in the particles and the like can be carried out using, for example, X-ray powder diffraction.

Furthermore, according to the present embodiment, the average value of the ratio of the major axis to the minor axis is 2 or greater for the first magnetic metal particles and 1 or greater for the second magnetic metal particles, the second magnetic metal particles are present between the particles of the first magnetic metal particles, and the average value of the major axis of the second magnetic metal particles is equal to or longer than the average value of the major axis of the first magnetic metal particles. Here, the ratio of the major axis to the minor axis (major axis/minor axis) is the aspect ratio. In order to achieve both high saturation magnetization and decrease of losses of the pressed powder material as described above, densification of the pressed powder material and suppression of coarsening of the magnetic metal grains are effective. By adopting the particle shapes of the present embodiment, progress of densification by sintering of the second magnetic metal particles and suppression of coarsening of the second magnetic metal particles by the first magnetic metal particles are effectively realized, and both high saturation magnetization and decrease in losses can be achieved in a well-balanced manner. Furthermore, a large ratio of the major axis to the minor axis is effective for reducing the eddy current loss. In addition, by adopting the particle shapes of the present embodiment, the second magnetic metal particles exhibit an effect similar to that of a binder for the first magnetic metal particles, and high mechanical characteristics can be obtained.

The average value of the major axis of the first magnetic metal particles is preferably from 1 μm to 500 μm. The average value is more preferably from 5 μm to 400 μm, and even more preferably from 10 μm to 300 μm. When the major axis is too short, the hysteresis loss increases due to an increase in coercivity resulting from making the powder finer. When the major axis is too long, a current path of the eddy current loss is likely to be formed, and the eddy current loss increases. The average value of the ratio of the major axis to the minor axis is preferably from 2 to 100.

The average value of the major axis of the second magnetic metal particles is preferably from 1 μm to 800 μm. The average value is more preferably from 5 μm to 700 μm, even more preferably from 10 μm to 600 μm, and still more preferably from 50 μm to 500 μm. When the major axis is too short, progress of sintering occurs insufficiently, and saturation magnetization is decreased. When the major axis is too long, a current path of the eddy current loss is likely to be formed, and the eddy current loss increases. The average value of the ratio of the major axis to the minor axis is preferably from 1 to 50.

Furthermore, when the value of the major axis and the ratio of the major axis to the minor axis are plotted for a plurality of second magnetic metal particles, and linear approximation is performed, the gradient (a) is preferably from 0.005/μm to 0.07/μm. In other words, the ratio of the major axis to the minor axis (major axis/minor axis) of certain particular second magnetic metal particles is plotted on the axis of ordinate, and the major axis of those second magnetic metal particles is plotted on the axis of abscissa, the unit of the major axis being expressed in μm. It is preferable that this gradient (a) is from 0.005/μm to 0.07/μm. When the gradient (a) is adjusted to this range, progress of densification and suppression of coarsening can be effectively realized.

Figure 2A:
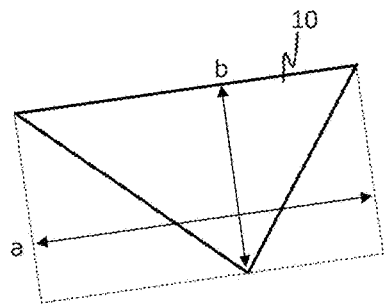
FIGS. 2A to 2C are schematic diagrams for describing a method for determining the major axis and the minor axis of a magnetic metal particle in the pressed powder material according to the first embodiment.
Figure 2B:
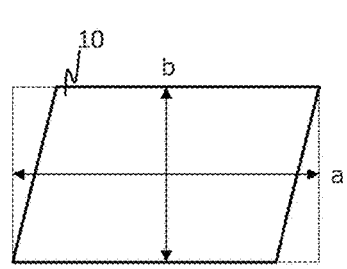
Figure 2C:
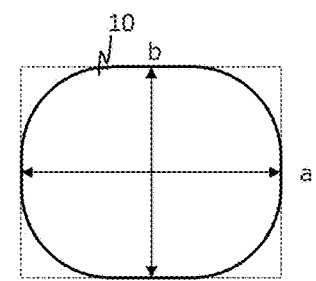

The existence form of the magnetic metal particles can be identified from, for example, an observation image of a cross-section of the pressed powder material. A cross-section of the pressed powder material can be obtained by cutting, fracture, and polishing of the pressed powder material. When the press direction of the pressed powder material can be identified, it is desirable to observe a cross-section parallel to the press direction. Furthermore, it is desirable to observe a cross-section in the vicinity of the center of the pressed powder material. For the observation of the cross-section, transmission electron microscopy (TEM), scanning electron microscopy (SEM), optical microscopy, or the like can be used. The average values of the major axis and the minor axis of the magnetic metal particles can be determined from the above-described observation image of a cross-section. FIGS. 2A to 2C are schematic diagrams for describing a method for determining the major axis and the minor axis of a magnetic metal particle in the pressed powder material according to the first embodiment. For example, the first magnetic metal particles and the second magnetic metal particles are identified by an energy dispersive X-ray (EDX) analysis. Next, any one magnetic metal particle is selected, and a rectangle having the smallest area and inscribing the magnetic metal particle is determined. The length of a long side of the determined rectangle is defined as the major axis of the selected magnetic metal particle, and the length of a short side of the determined rectangle is defined as the minor axis of the selected magnetic metal particle. By performing this operation for a plurality of the first and second magnetic metal particles and determining the respective average values, the average values of the major axis and the minor axis of the first and second magnetic metal particles can be determined. It is desirable that the number of the selected magnetic metal particles is 10 or more for each of the first and the second magnetic metal particles. When a sufficient number of particles cannot be observed in one observation cross-section, it is desirable to perform observation for a plurality of observation cross-sections and determine the average values.

Regarding the pressed powder material, it is preferable that the saturation magnetization is high, and the saturation magnetization is preferably 1 T or higher, more preferably 1.5 T or higher, even more preferably 1.8 T or higher, and still more preferably 2.0 T or higher. As the result, magnetization saturation is suppressed, and magnetic characteristics can be sufficiently exhibited in a system, which is preferable. Saturation magnetization of a pressed powder material can be evaluated using a vibrating sample magnetometer (VSM) or the like.

The density of a molded body of the pressed powder material is preferably 6 $g/cm^3$ or more. It is because when the density is less than 6 $g/cm^3$, high saturation magnetization as the pressed powder material cannot be obtained.

Next, an example of the method for producing the pressed powder material according to the first embodiment will be described.

The pressed powder material according to the first embodiment can be produced by preparing first and second magnetic metal particle powders, mixing the magnetic metal particle powders, molding the mixed powder, and then subjecting the molded body to a heat treatment.

A method for producing the first and second magnetic metal particle powders will be described. Raw materials are weighed so as to obtain a desired composition ratio, and then the raw materials are melted to produce an alloy. For the melting method, high-frequency melting, arc melting, and the like can be used. The obtained alloy may be subjected to a heat treatment for homogenization. A magnetic metal particle powder can be produced by pulverizing the obtained alloy. Regarding the pulverization method, a ball mill, a jet mill, a jaw crusher, or the like can be used. Furthermore, the alloy may be shaped into a ribbon shape using a liquid quenching apparatus. The liquid quenching method may be a single roll method or a twin roll method. By adopting a ribbon shape, the ribbon can be easily pulverized, distortion applied to the powder in the pulverization step is reduced, and the increase in coercivity is suppressed, which is therefore preferable. The ribbon before pulverization may be subjected to a heat treatment at a temperature of 300° C. to 1200° C. As a result, pulverizability can be further enhanced. For the pulverization of the ribbon, a cutter mill, a mixer, a ball mill, a jet mill, or the like can be used. Furthermore, a powder of magnetic metal particles may also be produced using an atomization method. Regarding the atomization method, a gas atomization method, a water atomization method, or the like can be used. Furthermore, a carbonyl iron powder produced by thermal decomposition of carbonyl iron, or reduced iron powder obtained by reducing iron oxide, may be used. The obtained powder may be classified using screens, sieves, and the like.

The first and second magnetic metal particle powders are mixed. Regarding the mixing ratio, the proportion of the second magnetic metal particle powder with respect to the total amount of the first and second magnetic metal particle powders is controlled to be more than 10, and 90% or less. When the proportion of the second magnetic metal particle powder is too small, the effect of densifying the pressed powder material is small, and the saturation magnetization is lowered. When the proportion is too large, the second magnetic metal particles become coarse, and the eddy current loss is increased. The proportion is more preferably from 15% to 70%, and even more preferably from 20% to 60%.

The powder after mixing is molded. Compression molding, injection molding, or the like can be used. During molding, a small amount of a binder may be incorporated. The binder is preferably a resin, an oxide having a eutectic system, or the like. Regarding the resin, for example, a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark, polytetrafluoroethylene)-based resin, a polyurethane resin, a cellulose-based resin, an acrylonitrile-butadiene-styrene (ABS) resin, a nitrile-butadiene-based rubber, a styrene-butadiene-based rubber, a silicone resin, other synthetic rubbers, natural rubber, an epoxy resin, a phenol resin, an allyl resin, a polybenzimidazole resin, an amide-based resin, a polyimide-based resin, a polyamideimide resin, or copolymers of those resins are used. Regarding the oxide having a eutectic system, an oxide having a eutectic system including at least two kinds of third elements selected from the group consisting of, for example, boron (B), silicon (Si), chromium (Cr), molybdenum (Mo), niobium (Nb), lithium (Li), barium (Ba), zinc (Zn), lanthanum (La), phosphorus (P), aluminum (Al), germanium (Ge), tungsten (W), sodium (Na), titanium (Ti), arsenic (As), vanadium (V), calcium (Ca), bismuth (Bi), lead (Pb), tellurium (Te), and tin (Sn), is used. Particularly, it is preferable to include a eutectic system including at least two elements selected from B, Bi, Si, Zn, and Pb. Molding may be performed in an applied magnetic field. Thereby, the orientation properties of the magnetic metal particle powder can be enhanced. Furthermore, during compression molding, it is preferable to pressurize the magnetic metal particle powder at a pressure of 1000 kgf/cm$^2$ or greater. This is effective for densification of the pressed powder material. The pressure is more preferably 5000 kgf/cm$^2$ or greater, and even more preferably 10000 kgf/cm$^2$ or greater.

The molded body is subjected to a heat treatment. The heat treatment temperature is preferably from 500° C. to 1200° C. When the temperature is too low, the effect of densifying the pressed powder material is low, and the saturation magnetization is lowered. When the temperature is too high, coarsening of the magnetic metal particles proceeds, and the eddy current loss is increased. The temperature is preferably from 600° C. to 1100° C., and more preferably from 700° C. to 1000° C. The retention time for the heat treatment is preferably from 1 minute to 200 hours. When the retention time is too short, density unevenness is likely to occur in the inner part of the pressed powder material. When the retention time is too long, productivity is noticeably decreased. The heat treatment atmosphere can be selected from a hydrogen atmosphere, an argon atmosphere, a nitrogen atmosphere, an air atmosphere, a mixed atmosphere of hydrogen, argon, and the like, a vacuum, and the like. Furthermore, the heat treatment may be performed in an applied magnetic field. As a result, the orientation properties of the magnetic metal particle powder can be enhanced.

Furthermore, the molding step and the heat treatment step may be carried out simultaneously using a hot press, a hot isostatic pressing, or the like, and the obtained molded body may be further subjected to a heat treatment. Densification can be achieved more effectively by selecting an appropriate method in accordance with the material composition, shape, or the like.

According to the present embodiment, a pressed powder material having excellent characteristics, such as high saturation magnetization, low magnetic loss, and high mechanical characteristics, can be provided.

Second Embodiment

A plurality of magnetic metal particles included in the pressed powder material according to the present embodiment are different from the first embodiment from the viewpoint that at least a portion of the surface of the magnetic metal particles is covered with a coating layer having a thickness of from 0.1 nm to 1 μm and containing at least one second element selected from the group consisting of oxygen (O), carbon (C), nitrogen (N), phosphorus (P), and fluorine (F).

Incidentally, any matters overlapping with the contents of the first embodiment will not be described repeatedly.

Figure 3A:
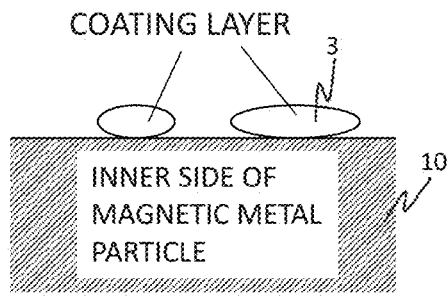
FIGS. 3A and 3B are schematic diagrams of magnetic metal particles according to a second embodiment.
Figure 3B:
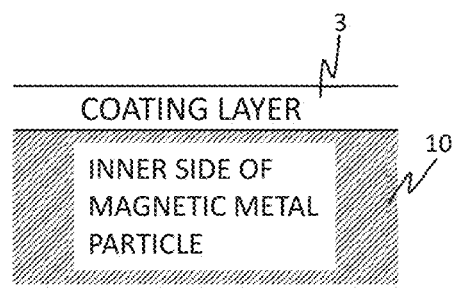

FIG. 3 is a schematic diagram of magnetic metal particles according to the second embodiment. A coating layer 3 is illustrated.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements and contains at least one second element selected from the group consisting of oxygen (O), carbon (C), nitrogen (N), phosphorus (P), and fluorine (F). The non-magnetic metal is particularly preferably Al or Si, from the viewpoint of thermal stability. When the magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one of the same non-magnetic metal as the non-magnetic metal, which is one of the constituent components of the magnetic metal particles. Among oxygen (O), carbon (C), nitrogen (N), phosphorus (P), and fluorine (F), it is preferable that the coating layer contains oxygen (O), and it is preferable that the coating layer contains an oxide or a composite oxide. This is from the viewpoints of the ease of forming the coating layer, oxidation resistance, and thermal stability. As the result, the adhesiveness of the magnetic metal particles and the coating layer can be enhanced, and it is possible to enhance the thermal stability and oxidation resistance of the pressed powder material. The coating layer not only can enhance thermal stability and oxidation resistance but also can increase the electrical resistance of the pressed powder material. By increasing the electrical resistance, the eddy current loss can be suppressed, and the frequency characteristics of the magnetic permeability can be enhanced. Therefore, the coating layer 14 is preferably electrically highly resistant, and it is preferable that the coating layer 14 has a resistance value of, for example, 1 mΩ·cm or more.

Furthermore, it is also preferable that the coating layer contains at least one magnetic metal selected from the group consisting of iron, cobalt, and compounds of iron and cobalt, the magnetic metal being one of the constituent components of the magnetic metal particles, and contains at least one second element selected from the group consisting of oxygen (O), carbon (C), nitrogen (N), phosphorus (P), and fluorine (F).

The thickness of the coating layer is such that a larger thickness is more preferable from the viewpoints of thermal stability, oxidation resistance, and electrical resistance. However, when the thickness of the coating layer becomes too thick, saturation magnetization is decreased, and accordingly, magnetic permeability is also decreased, which is not preferable. A preferred thickness of the coating layer is from 0.1 nm to 1 μm, and the thickness is more preferably from 0.1 nm to 100 nm.

It is preferable that the coating layer may be in a film form; however, the coating layer may have a microparticulate shape. In the case of a microparticulate shape, the average particle size is preferably from 0.1 nm to 1 μm, and more preferably from 0.1 nm to 100 nm. Also, a film form and a microparticulate shape may exist as a mixture.

Thus, according to the present embodiment, a pressed powder material having excellent characteristics such as high magnetic permeability, low losses, excellent mechanical characteristics, and high thermal stability, can be provided.

Third Embodiment

Systems and device apparatuses according to the present embodiment have the pressed powder material according to the first or second embodiment. Therefore, any matters overlapping with the contents of the first or second embodiment will not be described repeatedly. Examples of the component parts of the pressed powder material included in these systems and device apparatuses include cores for rotating electric machines (for example, a motor and a generator) such as various motors and generators, potential transformers, inductors, transformers, choke coils, and filters; and magnetic wedges (magnetic chocks) for a rotating electric machine. FIG. 4 is a schematic diagram of a motor system according to a third embodiment. The motor system is an example of a rotating electric machine system. The motor system is a system including a control system for controlling the rotational speed and the electric power (output power) of a motor. Regarding the mode of controlling the rotational speed of a motor, there are control methods that are based on control by a bridge servo circuit, proportional current control, voltage comparison control, frequency synchronization control, phase locked loop (PLL) control, and the like. As an example, a control method based on PLL is illustrated in FIG. 4. A motor system that controls the rotational speed of a motor by PLL includes a motor; a rotary encoder that converts the amount of mechanical displacement of the rotation of the motor into electrical signals and detects the rotational speed of the motor; a phase comparator that compares the rotational speed of the motor given by a certain command, with the rotational speed of the motor detected by the rotary encoder, and outputs the difference of those rotational speeds; and a controller that controls the motor so as to make the difference of the rotational speeds small. On the other hand, examples of the method for controlling the electric power of the motor include control methods based on pulse width modulation (PWM) control, pulse amplitude modulation (PAM) control, vector control, pulse control, bipolar drive, pedestal control, and resistance control. Furthermore, other examples of the control method include control methods such as micro-step drive control, multiphase drive control, inverter control, and switching control. As an example, a control method using an inverter is illustrated in FIG. 4. A motor system that controls the electric power of the motor using an inverter includes an alternating current power supply; a rectifier that converts the output of the alternating current power supply to a direct current; an inverter circuit that converts the direct current to an alternating current based on an arbitrary frequency; and a motor that is controlled by this alternating current.

Figure 5:
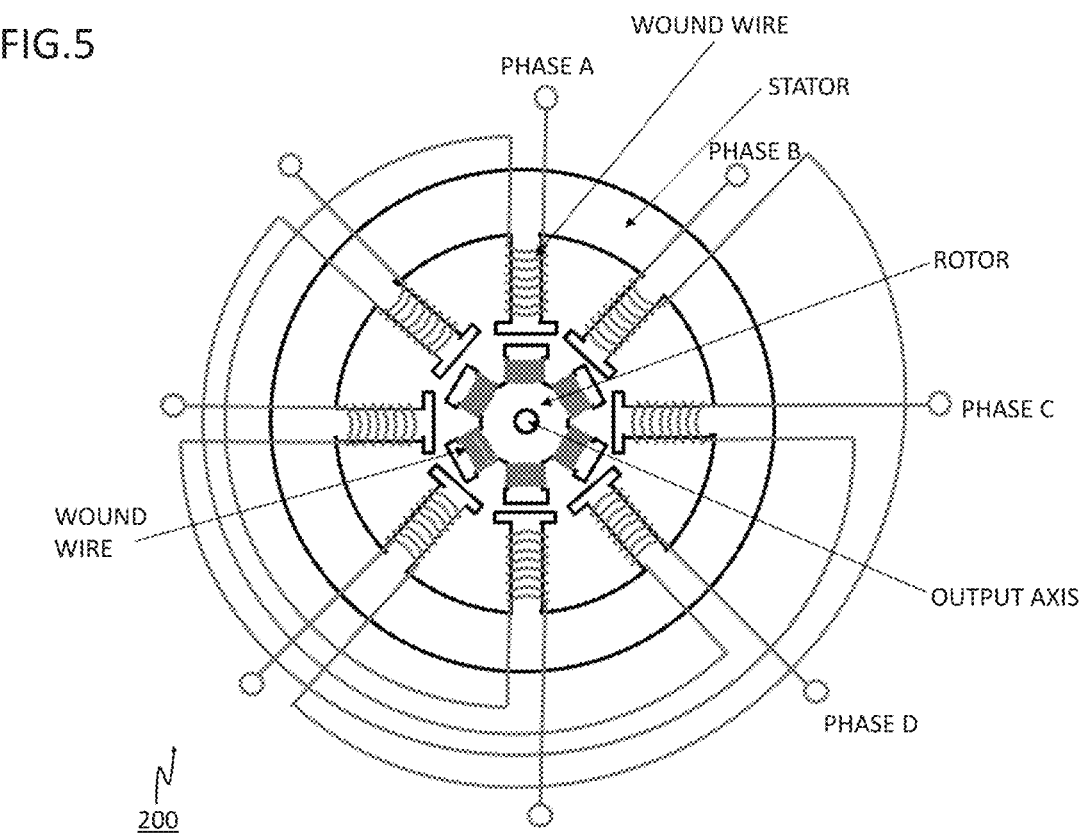
FIG. 5 is a schematic diagram of a motor according to the third embodiment.

FIG. 5 illustrates a schematic diagram of a motor according to the third embodiment. A motor 200 is an example of the rotating electric machine. In the motor 200, a first stator (magneto stator) and a second rotor (rotator) are disposed. The diagram illustrates an inner rotor type in which a rotor is disposed on the inner side of a stator; however, an outer rotor type in which the rotor is disposed on the outer side of the stator may also be used.

Figure 6:
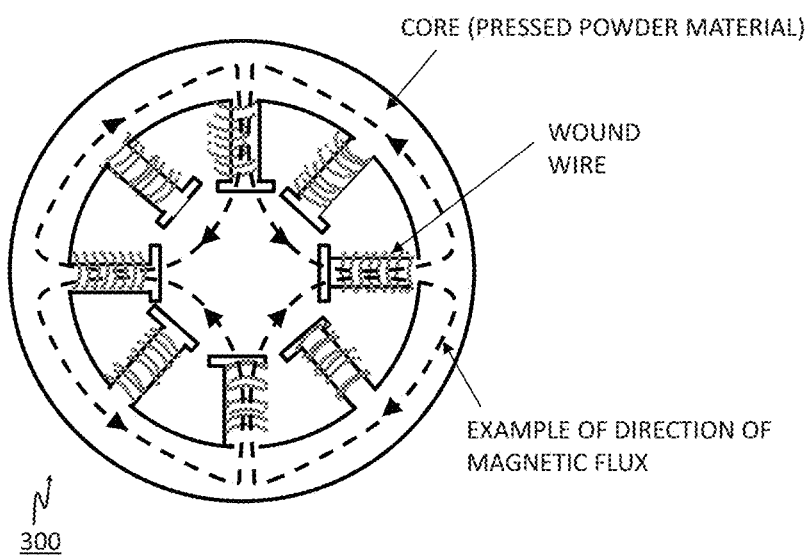
FIG. 6 is a schematic diagram of a motor core (stator) according to the third embodiment.
Figure 7:
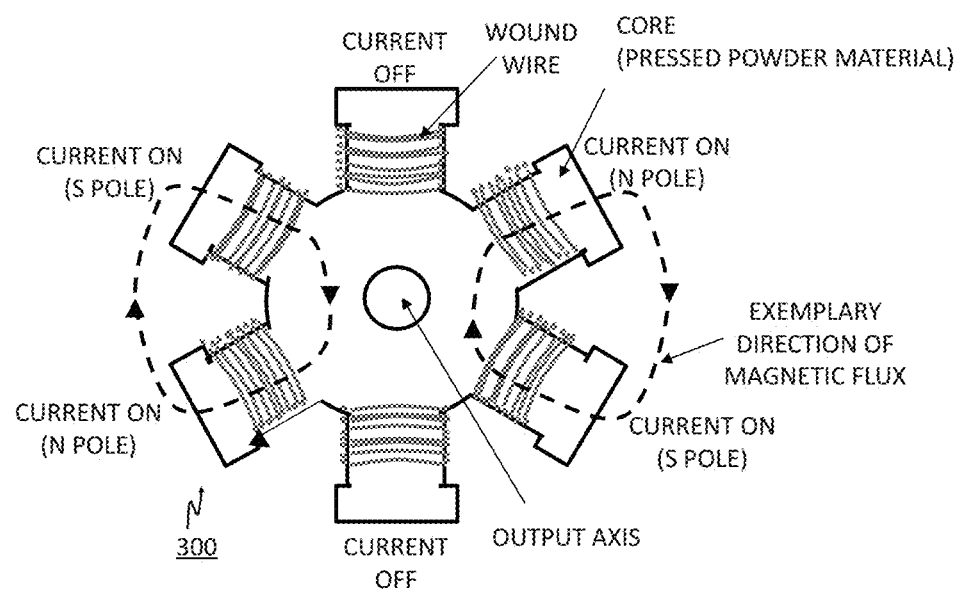
FIG. 7 is a schematic diagram of a motor core (rotor) according to the third embodiment.

FIG. 6 is a schematic diagram of a motor core (stator) according to the third embodiment. FIG. 7 is a schematic diagram of a motor core (rotor) according to the third embodiment. Regarding the motor core 300 (core of a motor), the cores of a stator and a rotor correspond to the motor core. This will be described below. FIG. 6 is a schematic diagram of a first stator. The first stator has a core and coils. The coils are wound around some of the protrusions of the core, which are provided on the inner side of the core. In this core, the pressed powder material according to the first or second embodiment can be disposed. FIG. 7 is a schematic diagram of a first rotor. The first rotor has a core and coils. The coils are wound around some of the protrusions of the core, which are provided on the outer side of the core. In this core, the pressed powder material according to the first or second embodiment can be disposed.

FIG. 6 and FIG. 7 are intended only for illustrative purposes to describe examples of motors, and the applications of the pressed powder material are not limited to these.

The pressed powder material can be applied to all kinds of motors as cores for making it easy to induce a magnetic flux.

Figure 8:
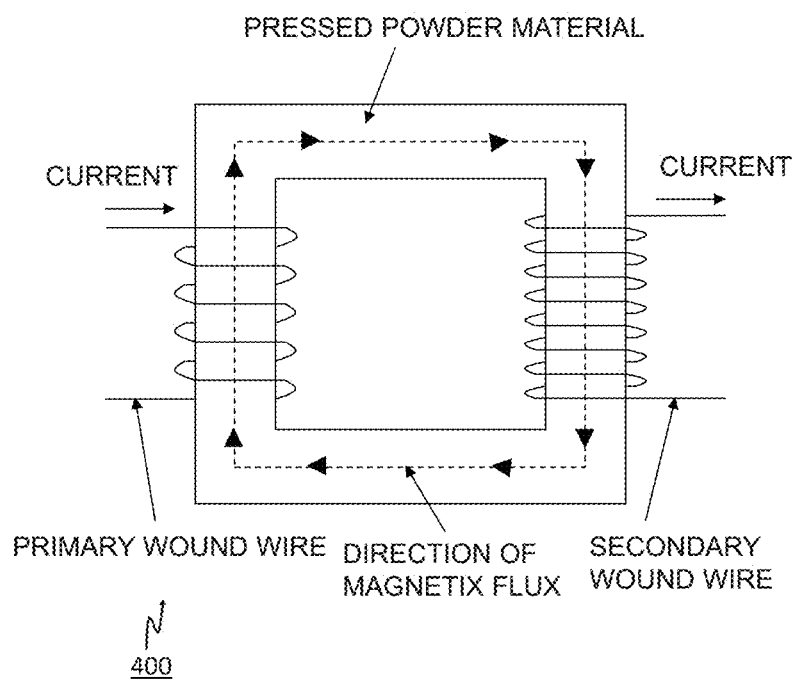
FIG. 8 is a schematic diagram of a potential transformer or a transformer according to the third embodiment.

FIG. 8 is a schematic diagram of a potential transformer or a transformer according to the third embodiment. FIG. 9 is a schematic diagram of inductors (ring-shaped inductor and rod-shaped inductor) according to the third embodiment. FIG. 10 is a schematic diagram of inductors (chip inductor and planar inductor) according to the third embodiment. These diagrams are also intended only for illustrative purposes. Also for the potential transformer or transformer 400 and the inductor 500, similarly to the motor core, the pressed powder material can be applied to all kinds of potential transformers or transformers and inductors in order to make it easy to induce a magnetic flux or to utilize high magnetic permeability.

Figure 11:
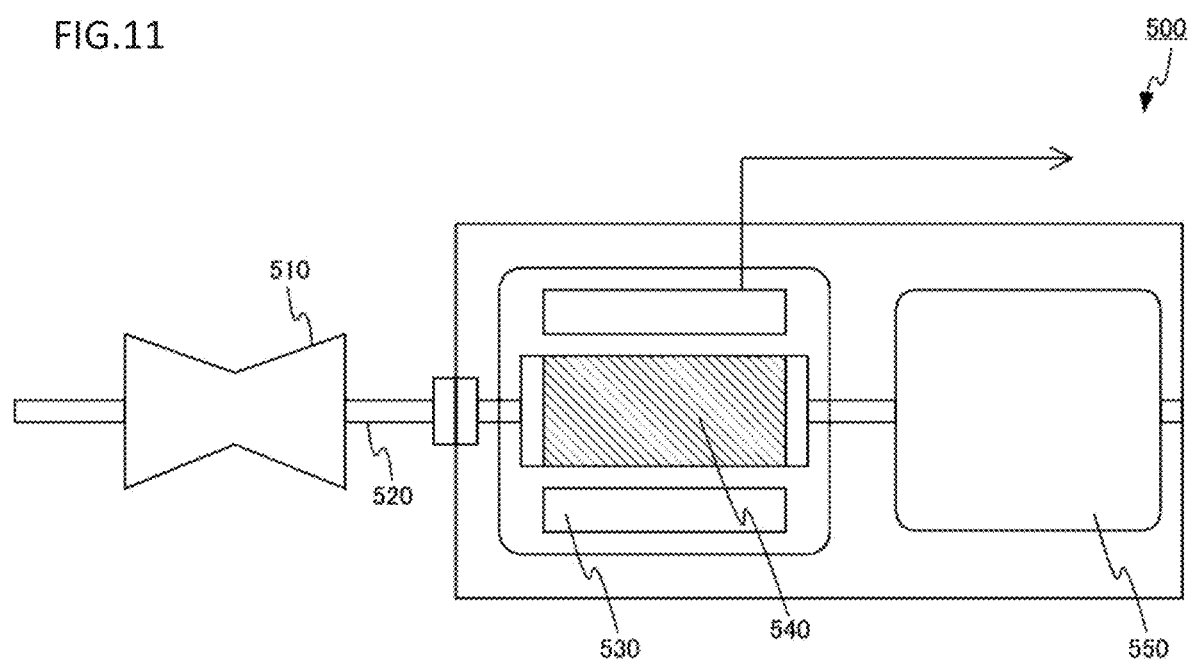
FIG. 11 is a schematic diagram of a generator according to the third embodiment.

FIG. 11 is a schematic diagram of a generator 500 according to the third embodiment. The generator 500 is an example of the rotating electric machine. The generator 500 includes either or both of a second stator (magneto stator) 530 that uses the pressed powder material according to the first or second embodiment as the core; and a second rotor (rotator) 540 that uses the pressed powder material according to the first or second embodiment as the core. In the diagram, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not illustrated in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not illustrated in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not illustrated in the diagram, and a main transformer that is not illustrated in the diagram. Meanwhile, in the second rotor, an electrostatic charge is generated due to an axial current generated concomitantly with the static electricity from the turbine or with power generation. Therefore, the generator includes a brush intended for discharging the electrostatic charge of the second rotor.

Furthermore, the rotating electric machine of the present embodiment can be preferably used in railway vehicles. For example, the rotating electric machine can be preferably used in the motor 200 that drives a railway vehicle, or the generator 500 that generates electricity for driving a railway vehicle.

In order for the pressed powder material to be applied to these systems and device apparatuses, the pressed powder material is allowed to be subjected to various kinds of processing. For example, in the case of a sintered body, the pressed powder material is subjected to mechanical processing such as polishing or cutting, and in the case of a powder, the magnetic material is mixed with a resin such as an epoxy resin or polybutadiene. If necessary, the pressed powder material is further subjected to a surface treatment. Also, if necessary, a coiling treatment is carried out.

According to the systems and device apparatuses of the present embodiment, a motor system, a motor, a potential transformer, a transformer, an inductor, and a generator, all having excellent characteristics (high efficiency and low losses), can be realized.

EXAMPLES

Hereinafter, embodiments will be described in more detail by comparing Examples 1 to 11 with Comparative Examples. For the pressed powder materials obtainable by Examples and Comparative Examples that will be described below, a summary of the compositions of the first and second magnetic metal particles, the ratio of Co2 to Co1 (Co2/Co1), the average values of the major axes of the first and second magnetic metal particles, the average values of the ratios of the major axis to the minor axis of the first and second magnetic metal particles, the gradient (a) in the case of plotting the value of the major axis of the second magnetic metal particles and the ratio of the major axis to the minor axis and performing linear approximation, the saturation magnetization, and the eddy current loss, is shown in Table 1. In addition, with regard to the eddy current loss, the case of Comparative Example 1 was designated as the reference, and a case where the eddy current loss decreased by 10% to 50% with respect to the reference was rated as ○, a case where the eddy current loss decreased by 50% or more was rated as ⊙, while a case where the decrease rate was less than 10% or there was no decrease was rated as x.

Example 1

First, raw materials were weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, an iron powder is prepared as a second magnetic metal particle powder, and the first magnetic metal particle powder and the second magnetic metal particle powder are mixed at a weight ratio of 50:50. The mixed powder is press-molded using a mold at a pressure of 12000 kgf/cm². The obtained molded body is subjected to a heat treatment of retaining the molded body for 5 hours at 900° C. in a mixed atmosphere of $H_2$ and Ar to obtain a pressed powder material. For the obtained pressed powder material, saturation magnetization was evaluated with VSM, the core loss was measured with a B-H analyzer, the eddy current loss was evaluated from the frequency-dependence of the core loss, and the average value of the ratio of the major axis to the minor axis and the value of a were evaluated from SEM observation of a cross-section.

Examples 2 to 7

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, an iron powder is prepared as a second magnetic metal particle powder, and the first magnetic metal particle powder and the second magnetic metal particle powder are mixed at a weight ratio of 70:30. The mixed powder is press-molded using a mold at a pressure of 12000 kgf/cm². The obtained molded body is subjected to a heat treatment of retaining the molded body for 3 hours at 1000° C. in a mixed atmosphere of $H_2$ and Ar to obtain a pressed powder material. The obtained pressed powder material was evaluated by the same methods as those used in Example 1.

Examples 8 and 9

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in a $H_2$ atmosphere. Next, this ribbon is pulverized using a mixer apparatus and classified using a sieve having an opening diameter of 75 μm, and thereby a second magnetic metal particle powder is obtained. The first magnetic metal particle powder and the second magnetic metal particle powder are mixed at a weight ratio of 60:40. The mixed powder is press-molded using a mold at a pressure of 10000 kgf/cm². The obtained molded body is subjected to a heat treatment of retaining the molded body for 10 hours at 900° C. in a mixed atmosphere of $H_2$ and Ar to obtain a pressed powder material. The obtained pressed powder material was evaluated by the same methods as those used in Example 1.

Example 10

A mixed powder of a first magnetic metal particle powder and a second magnetic metal particle powder produced by the same method as those used in Example 1 is subjected to a silica coating treatment using hydrolysis of tetraethoxysilane (TEOS). The powder obtained after the coating treatment is press-molded using a mold at a pressure of 12000 kgf/cm². The obtained molded body is subjected to a heat treatment of retaining the molded body for 5 hours at 900° C. in a mixed atmosphere of $H_2$ and Ar to obtain a pressed powder material. The obtained pressed powder material was evaluated by the same methods as those used in Example 1.

Example 11

A phosphoric acid solution is added to a mixed powder of a first magnetic metal particle powder and a second magnetic metal particle powder produced by the same method as those used in Example 1, and the mixture is subjected to a heat treatment at 200° C. in air. The powder obtained after the heat treatment is subjected to a silica coating treatment using TEOS. The powder obtained after the coating treatment is press-molded using a mold at a pressure of 12000 kgf/cm². The obtained molded body is subjected to a heat treatment of retaining the molded body for 4 hours at 900° C. in a mixed atmosphere of $H_2$ and Ar to obtain a pressed powder material. The obtained pressed powder material was evaluated by the same methods as those used in Example 1.

Comparative Example 1

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, a second magnetic metal particle powder is produced by the same method as that for the first magnetic metal particle powder. The first magnetic metal particle powder and the second magnetic metal particle powder are mixed at a weight ratio of 50:50. The mixed powder is press-molded using a mold at a pressure of 12000 kgf/cm². The obtained molded body is subjected to a heat treatment of retaining the molded body for 5 hours at 1000° C. in a mixed atmosphere of $H_2$ and Ar to obtain a pressed powder material. The obtained pressed powder material was evaluated by the same methods as those used in Example 1.

Comparative Example 2

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, a second magnetic metal particle powder is produced by the same method as that for the first magnetic metal particle powder. The first magnetic metal particle powder and the second magnetic metal particle powder are mixed at a weight ratio of 50:50. The mixed powder is press-molded using a mold at a pressure of 12000 kgf/cm². The obtained molded body is subjected to a heat treatment of retaining the molded body for 5 hours at 1250° C. in a mixed atmosphere of $H_2$ and Ar to obtain a pressed powder material. The obtained pressed powder material was evaluated by the same methods as those used in Example 1.

Comparative Example 3

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, an iron powder is prepared as a second magnetic metal particle powder, and the first magnetic metal particle powder and the second magnetic metal particle powder are mixed at a weight ratio of 20:80. The mixed powder is press-molded using a mold at a pressure of 12000 kgf/cm². The obtained molded body is subjected to a heat treatment of retaining the molded body for 5 hours at 1000° C. in a mixed atmosphere of $H_2$ and Ar to obtain a pressed powder material. The obtained pressed powder material was evaluated by the same methods as those used in Example 1.

Comparative Example 4

First, raw materials are weighed so as to obtain the composition indicated in Table 1, and an alloy is produced by high-frequency melting. A ribbon is produced from the obtained alloy using a single roll quenching apparatus. Next, the obtained ribbon is subjected to a heat treatment at 500° C. in an Ar atmosphere. Next, this ribbon is pulverized using a mixer apparatus and classified using a sieve having an opening diameter of 75 μm, and thereby a first magnetic metal particle powder is obtained. Next, an iron powder is prepared as a second magnetic metal particle powder, and the first magnetic metal particle powder and the second magnetic metal particle powder are mixed at a weight ratio of 90:10. The mixed powder is press-molded using a mold at a pressure of 12000 kgf/cm². The obtained molded body is subjected to a heat treatment of retaining the molded body for 5 hours at 1000° C. in a mixed atmosphere of $H_2$ and Ar to obtain a pressed powder material. The obtained pressed powder material was evaluated by the same methods as those used in Example 1.

While certain embodiments have been described, these embodiments have been presented by way of example only, and are not intended to limit the scope of the inventions. Indeed, the pressed powder material described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A pressed powder material comprising:
   first magnetic metal particles having a first magnetic metal phase containing Fe and Co; and
   second magnetic metal particles having a second magnetic metal phase containing Fe,
   wherein when amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and greater than 1.2 for the second

TABLE 1

| | Composition (at %) | | | Average value of major axis (μm) | | Average value of ratio of major axis to minor axis | | | | |
|---|---|---|---|---|---|---|---|---|---|---|
| | First magnetic metal particles | Second magnetic metal particles | Co2/Co1 | First magnetic metal particles | Second magnetic metal particles | First magnetic metal particles | Second magnetic metal particles | α | (T) Saturation magnetization | Eddy current loss |
| Example 1 | Fe74Co18Si8 | Fe100 | 0 | 70 | 140 | 5 | 4 | 0.03 | 1.7 | ⊙ |
| Example 2 | Fe73Co17Si10 | Fe100 | 0 | 100 | 200 | 6 | 3 | 0.03 | 1.7 | ○ |
| Example 3 | Fe70Co17Si13 | Fe100 | 0 | 90 | 180 | 5 | 2 | 0.01 | 1.6 | ○ |
| Example 4 | Fe82Co9Si9 | Fe100 | 0 | 110 | 190 | 3 | 3 | 0.02 | 1.8 | ○ |
| Example 5 | Fe65Co27Si8 | Fe100 | 0 | 70 | 210 | 4 | 2 | 0.01 | 1.6 | ○ |
| Example 6 | Fe64Co26Si10 | Fe100 | 0 | 70 | 200 | 5 | 2 | 0.01 | 1.6 | ○ |
| Example 7 | Fe65Co27Si8 | Fe99Co1 | 0.03 | 70 | 100 | 6 | 3 | 0.04 | 1.6 | ○ |
| Example 8 | Fe74Co18Si8 | Fe92Si8 | 0 | 80 | 160 | 5 | 3 | 0.03 | 1.7 | ⊙ |
| Example 9 | Fe73Co17Si10 | Fe92Si8 | 0 | 80 | 160 | 5 | 3 | 0.03 | 1.6 | ⊙ |
| Example 10 | Fe74Co18Si8 | Fe100 | 0 | 60 | 130 | 6 | 4 | 0.04 | 1.7 | ⊙ |
| Example 11 | Fe74Co18Si8 | Fe100 | 0 | 60 | 120 | 6 | 4 | 0.04 | 1.7 | ⊙ |
| Comparative Example 1 | Fe74Co18Si8 | Fe74Co18Si8 | 1 | 100 | 100 | 5 | 5 | 0.08 | 1.5 | X |
| Comparative Example 2 | Fe74Co18Si8 | Fe74Co18Si8 | 1 | 600 | 600 | 1.2 | 1.2 | 0.003 | 1.6 | X |
| Comparative Example 3 | Fe74Co18Si8 | Fe100 | 0 | 60 | 900 | 4 | 1 | 0.004 | 1.8 | X |
| Comparative Example 4 | Fe74Co18Si8 | Fe100 | 0 | 100 | 50 | 4 | 4 | 0.09 | 1.5 | X |

As is obvious from Table 1, the pressed powder materials according to Examples 1 to 11 are such that the ratio of Co2 to Co1 (Co2/Co1) is from 0 to 0.5, the average value of the ratio of the major axis to the minor axis is 2 or greater for the first magnetic metal particles and 1 or greater for the second magnetic metal particles, and the average value of the major axis of the second magnetic metal particles is equal to or longer than the average value of the major axis of the first magnetic metal particles. On the other hand, in the Comparative Examples, those values are not included in the above-described ranges.

The pressed powder materials according to Examples 1 to 11 exhibit decreased eddy current loss while maintaining high saturation magnetization as compared to the pressed powder materials of the Comparative Examples, and notable effects are obtained.

magnetic metal particles, the second magnetic metal particles are present between the first magnetic metal particles, the average value of the major axis of the second magnetic metal particles is equal to or longer than the average value of the major axis of the first magnetic metal particles, and the average value of the major axis of the first magnetic metal particles is from 1 μm to 500 μm, and
   wherein when the relationship between the value of the major axis and the ratio of the major axis to the minor axis of the second magnetic metal particles is subjected to linear approximation, the gradient is from 0.005/μm to 0.07/μm.

2. The pressed powder material according to claim 1, wherein the first magnetic metal particles have an average length of from 10 μm to 300 μm and an average value of the ratio of the major axis to the minor axis of from 2 to 100, and the second magnetic metal particles have an average length of from 50 μm to 500 μm and an average value of the ratio of the major axis to the minor axis of from greater than 1.2 to 50.

3. The pressed powder material according to claim 1, wherein the density of a molded body of the pressed powder material is 6 g/cm³ or more.

4. The pressed powder material according to claim 1, wherein the Co1 is from 5 at % to 80 at %, and the Co2 is from 0 at % to 2.5 at %.

5. The pressed powder material according to claim 1,
wherein the first magnetic metal phase of the first magnetic metal particles further contains from 0.001 at % to 30 at % of Si with respect to the total amount of the first magnetic metal phase, and
the second magnetic metal phase of the second magnetic metal particles further contains from 0 at % to 30 at % of Si with respect to the total amount of the second magnetic metal phase.

6. A rotating electric machine comprising the pressed powder material according to claim 1.

7. A rotating electric machine comprising a core containing the pressed powder material according to claim 1.

8. A pressed powder material comprising:
first magnetic metal particles having a first magnetic metal phase containing Fe and Co; and
second magnetic metal particles having a second magnetic metal phase containing Fe,
wherein when amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and greater than 1.2 for the second magnetic metal particles, the second magnetic metal particles are present between the first magnetic metal particles, the average value of the major axis of the second magnetic metal particles is equal to or longer than the average value of the major axis of the first magnetic metal particles, and the average value of the major axis of the first magnetic metal particles is from 1 μm to 500 μm,
wherein the first magnetic metal phase of the first magnetic metal particles further contains from 0.001 at % to 30 at % of Si with respect to the total amount of the first magnetic metal phase, and
the second magnetic metal phase of the second magnetic metal particles further contains from 0 at % to 30 at % of Si with respect to the total amount of the second magnetic metal phase.

9. A rotating electric machine comprising a pressed powder material, the pressed powder material including:
first magnetic metal particles having a first magnetic metal phase containing Fe and Co; and
second magnetic metal particles having a second magnetic metal phase containing Fe,
wherein when amounts of Co with respect to the total amounts of Fe and Co of the first and second magnetic metal particles are designated as Co1 and Co2, respectively, the ratio of Co2 to Co1 (Co2/Co1) is from 0 to 0.5, the average value of the ratio of the major axis to the minor axis is 2 or greater for the first magnetic metal particles and greater than 1.2 for the second magnetic metal particles, the second magnetic metal particles are present between the first magnetic metal particles, the average value of the major axis of the second magnetic metal particles is equal to or longer than the average value of the major axis of the first magnetic metal particles, and the average value of the major axis of the first magnetic metal particles is from 1 μm to 500 μm.

* * * * *